(12) United States Patent
Narayan-Sarathy et al.

(10) Patent No.: US 7,504,441 B2
(45) Date of Patent: Mar. 17, 2009

(54) RADIATION-CURABLE HIGH GLOSS OVERPRINT VARNISH COMPOSITIONS

(75) Inventors: Sridevi Narayan-Sarathy, Dublin, OH (US); Michael L. Gould, Powell, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/974,948

(22) Filed: Oct. 17, 2007

(65) Prior Publication Data

US 2008/0039543 A1 Feb. 14, 2008

Related U.S. Application Data

(63) Continuation of application No. 11/109,479, filed on Apr. 19, 2005, now abandoned.

(60) Provisional application No. 60/564,025, filed on Apr. 21, 2004.

(51) Int. Cl.
*C08F 2/46* (2006.01)
*C08F 2/50* (2006.01)

(52) U.S. Cl. .............. 522/178; 522/181; 522/182; 522/183; 522/173; 522/176; 522/78; 522/74; 522/150; 522/151; 522/153; 522/134; 522/135; 522/142; 522/144; 428/500

(58) Field of Classification Search .......... 522/13, 522/30, 34, 35, 90, 96, 103, 104, 107, 173, 522/178, 180, 181, 182, 176, 78, 74, 150, 522/151, 153, 134, 135, 142, 144; 428/522
See application file for complete search history.

(56) References Cited

U.S. PATENT DOCUMENTS

| | | | | |
|---|---|---|---|---|
| 5,565,525 | A * | 10/1996 | Morimoto et al. | 525/259 |
| 5,945,489 | A * | 8/1999 | Moy et al. | 525/471 |
| 6,025,410 | A * | 2/2000 | Moy et al. | 522/182 |
| 6,855,796 | B2 * | 2/2005 | Lachowicz et al. | 528/220 |
| 7,169,825 | B2 * | 1/2007 | Narayan-Sarathy et al. | 522/13 |
| 2003/0195317 | A1 * | 10/2003 | Lachowicz et al. | 526/312 |
| 2005/0027082 | A1 * | 2/2005 | Narayan-Sarathy et al. | 525/471 |
| 2005/0107487 | A1 * | 5/2005 | Lachowicz et al. | 522/6 |
| 2005/0176874 | A1 * | 8/2005 | Panades et al. | 524/556 |

* cited by examiner

*Primary Examiner*—Sanza L McClendon

(57) ABSTRACT

The present invention relates to radiation-curable overprint varnishes for printed substrates based on multifunctional, uncrosslinked, liquid Michael addition resins. The compositions are UV-curable with little or no photoinitiator present.

21 Claims, 2 Drawing Sheets

RADIATION-CURABLE HIGH GLOSS OVERPRINT VARNISH COMPOSITIONS

CROSS REFERENCE TO RELATED APPLICATION

This application is a continuation application of U.S. application Ser. No. 11/109,479 filed on Apr. 19, 2005 now abandoned, the contents of which are hereby incorporated into this application. This application claims the benefit of U.S. application Ser. No. 11/109,479 filed on Apr. 19, 2005 and provisional application Ser. No. 60/564,025 filed on Apr. 21, 2004, the contents of which are hereby incorporated into this application.

BACKGROUND OF THE INVENTION

The present invention relates to radiation curable overprint varnishes (OPV). The overprint varnishes are based on multifunctional, uncrosslinked, liquid Michael addition resins formed from the reaction of acrylate monomers, known as Michael addition reaction acceptors (hereinafter "Michael acceptors") and β-ketoesters (e.g., ethyl acetoacetate), β-diketones (e.g., 2,4-pentanedione), and/or β-keto amides (e.g., acetoacetanilide, acetoacetamide), or other β-dicarbonyl compounds and mixtures thereof, known as Michael addition reaction donors (hereinafter "Michael donors") that can participate in the Michael addition reaction. The OPV formulations based on the above multifunctional, uncrosslinked, liquid Michael addition resins can be cured under standard UV cure conditions with no photoinitiator or substantially less photoinitiator than is currently used in UV-curable OPV compositions.

UV-curable OPVs are known. Typically, UV-curable overprint varnish coatings comprise a composition capable of curing when exposed to UV radiation such as an acrylate monomer, oligomer or polymer in the presence of a photoinitiator of some sort. In addition to the curable component, the OPVs contain various additives to modify and improve the performance of the cured coating. Examples of OPVs include the composition disclosed in U.S. Pat. Nos. 4,204,010, 4,227,979 and published US application 20020121631. U.S. Pat. No. 4,204,010 discloses an ethylenically unsaturated reactive thixotropic agent for use in radiation-curable overprint varnishes formed by reacting a hydroxyl-containing fatty acid ester with an ethylenically unsaturated isocyanate. The composition generally contains a photoinitiating component such as benzophenone. U.S. Pat. No. 4,227,979 discloses UV-curable OPVs containing an amine acrylate and various photo-promoters. Published US application 20020121631 discloses UV-curable OPV compositions that generally include di- and trifunctional acrylate monomer, a photoinitiator, an acrylated oligomer and an acrylic polymer emulsion.

Overprint varnishes are used to produce cured coatings that provide both a protective layer and embellished feel or appearance to printed materials. High quality overprint varnish coatings can give improved rub and scuff resistance and the lower coefficients of friction necessary for use in high speed packaging lines. OPVs can also be used to improve the appearance of conventional solvent and water-based inks which are often characterized by low gloss. Special finishes can be built into OPVs by using suitable additives. For example, pearlescent effects can be achieved by using specialized mica-based pearlescent pigments. Fluorescent and optical brightening additives can also be added. There is a wide scope for specialized finishes made possible by using such additives to enhance the final cured product.

The mode of application of OPVs is dependent on the final viscosity of the uncrosslinked liquid formulation. Low viscosity formulations are typically applied using flexographic, gravure, roll-coater, and flood or curtain-coater equipment. Historically, varnishing was often carried out separately from printing. Today, many new printing presses have in-line varnish coaters fitted after the printing units. For application over UV-based inks, some presses are fitted with interdeck and pre-coater UV lamps to ensure that the inks are cured before the varnish is applied, thus achieving a smooth lay-down and high gloss.

Typical starting point formulations for standard UV-curable OPVs contain up to 10 parts per hundred (10% w/w) of a photoinitiator package. Traditional photoinitiators (e.g., benzophenone) can be toxic, expensive, and malodorous and contribute to film color, which limits applicability of varnishes over white and light-colored inks.

The amount of photoinitiator added to OPV formulations can be significantly reduced by using the acrylate oligomer technology described in patents U.S. Pat. Nos. 5,945,489 and 6,025,410 (both Ashland, Inc.) the contents of which are incorporated herein by reference. These patents disclose uncrosslinked resins prepared via the Michael addition reaction of Michael donors such as β-dicarbonyl compounds with Michael acceptors such as multifunctional acrylates. The invention disclosed herein demonstrates the advantageous use of these uncrosslinked resins alone or modified by reaction/blending with additional materials in formulations for overprint varnish applications. These additional materials include a variety of reactive diluents and adhesion promoting acrylic monomers and oligomers as well as other vinyl monomers like N-vinyl caprolactam, primary, secondary and tertiary amines, acid-functional materials, siloxane-based defoamers, wetting agents, flow and leveling aids, elastomers, waxes and other components to modify and improve performance of the varnish.

Varnishes based on the resins described above can be cured by all methods typically used to crosslink acrylic materials. Cure, or crosslinking, is usually accomplished through a free radical chain mechanism, which may require any of a number of free radical-generating species such as peroxides, hydroperoxides, REDOX combinations, etc., which decompose to form radicals when heated, or at ambient temperature in the presence of amines and transition metal promoters. Ultra violet (UV) radiation is another means of initiating reaction by decomposing an appropriate photoinitiator to form free radicals. Electron beam (EB) radiation can also be used to effect cure.

OPVs based on the novel acrylate oligomers described in this invention offer significant advantages over varnishes based on traditional multifunctional acrylic monomers and oligomers in that they can be cured by exposure to UV radiation with no photoinitiator or a fraction of the photoinitiator required for standard UV-cure varnishes. Under typical UV curing conditions for OPVs (<300 mJ/cm$^2$ exposure), these varnishes can be effectively cured on a variety of substrates with very little or no photoinitiator.

The novel OPV formulations disclosed here exhibit performance properties that make them very effective across a range of substrates and these properties can be modified greatly depending upon oligomer composition and coating formulation rather than by blending with additives, as is done in traditional UV-curable systems. The varnishes can exhibit wide ranges of flexibility, stain resistance, scratch resistance, weather resistance, solvent resistance, etc. Almost any desired varnish performance parameter can be attained by proper selection of the raw material building blocks used to make the oligomers that form the basis of the OPV formulation.

SUMMARY OF THE INVENTION

The invention detailed herein comprises a family of radiation-curable, high gloss OPV compositions. These OPVs are based on multifunctional acrylate resins formed by the reaction of Michael acceptors such as acrylate monomers and oligomers with Michael donors such as β-keto esters (e.g., acetoacetates), β-diketones (e.g., 2,4-pentanedione), β-keto amides (e.g., acetoacetanilide, acetoacetamide), and/or other β-dicarbonyl or other compounds that can participate in the Michael addition reaction. An essential novelty of these OPV formulations is that they will cure under standard UV-cure conditions with very little or no traditional photoinitiator as compared to commercial formulations which require the addition of substantial photoinitiator.

The multi-functional polyacrylate oligomers, from which the varnishes of the present invention are formulated, have dual chemical functionality. That is, they have both acrylic functionality and a labile ketone group that is capable of dissociating to initiate free radical polymerization of the oligomer upon exposure to UV radiation. Final OPV properties can be modified in a number of ways including use of additional or supplementary acrylate materials, using any number of different β-dicarbonyl compounds, or simply varying the stoichiometry of the reactants which comprise the oligomer. Varnishes can be made softer and more flexible with less shrinkage and significantly better adhesion to a variety of substrates. OPVs based on the novel multifunctional acrylate resins of the present invention exhibit excellent gloss, adhesion, flexibility, solvent resistance, scratch resistance, and durability. These coatings may be cured via chemical means, thermally, or by exposure to UV or electron beam radiation.

Other materials, both reactive (conventional acrylates) and non-reactive (e.g., solvents) may also be incorporated into formulations to enhance the varnish properties on various substrates. These additives include a variety of acrylic monomers and oligomers, other vinyl monomers like N-vinyl caprolactam, primary, secondary, and tertiary amines, acid-functional monomers and oligomers, defoamers, wetting agents, flow and leveling aids, silicones, waxes and elastomers, among others.

Systems comprised of traditional monomers and oligomers often have compatibility issues with some of the above additives, making for less formulating options. However, formulations built from the novel photocurable oligomer resins described herein can incorporate a nearly unlimited variety of additives due to the chemical/architectural control possible in their synthesis. Thus, many more options are available to the formulator who must address specific challenges (e.g., adhesion, flexibility, etc.) for each particular substrate.

DETAILED DESCRIPTION OF THE INVENTION

Figure 1:
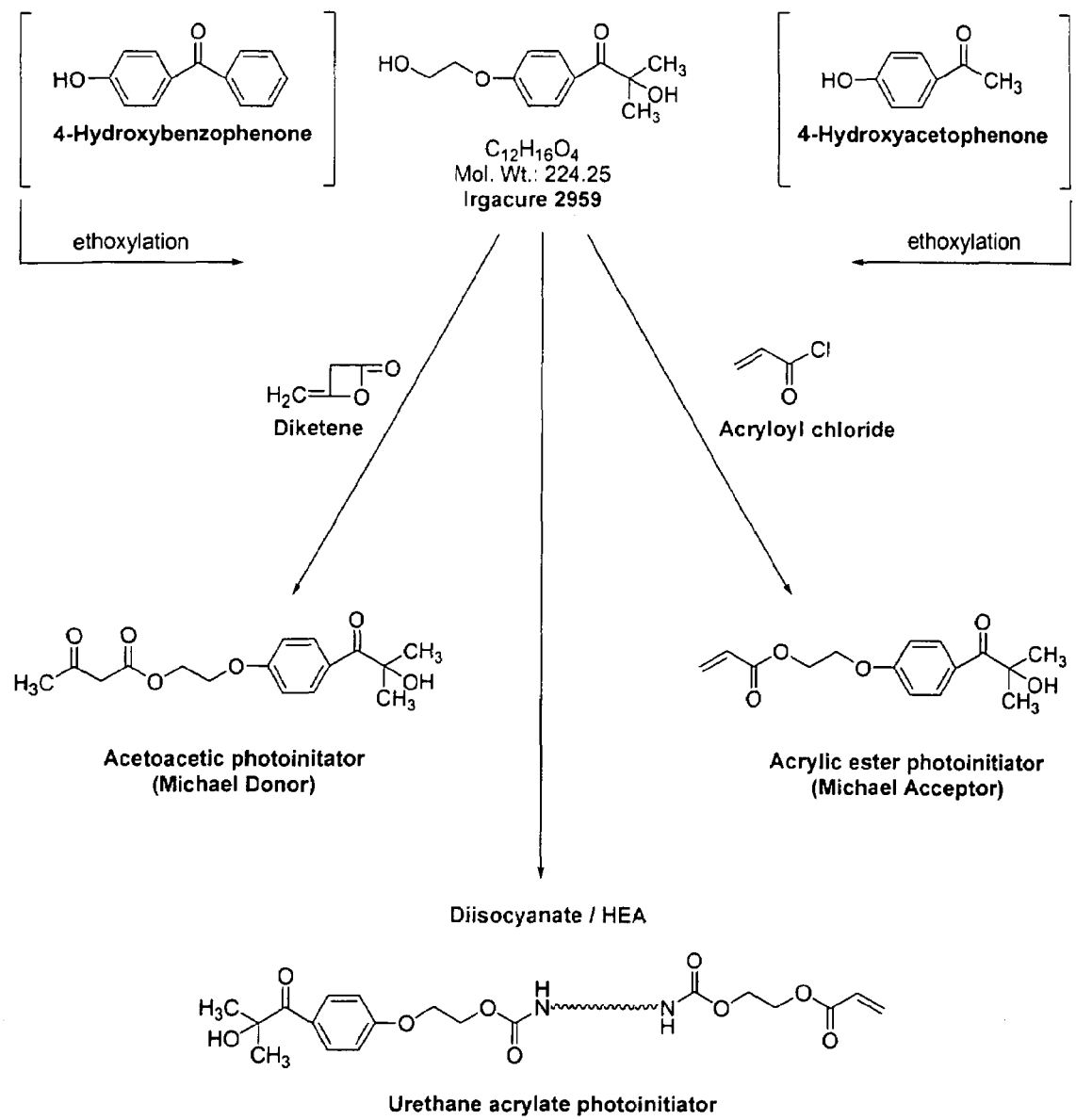
FIG. 1 depicts the preparation of a Michael donor with a built-in Type I photoinitiator and two Michael acceptors with a built-in Type I photoinitiator.

The invention relates to a radiation curable glossy overprint varnish. The high gloss overprint varnish compositions are comprised of a liquid, Michael addition resin comprising the uncrosslinked reaction product of a Michael donor and a Michael acceptor, and at least one of a number of components such as a diluent, a photoinitiator, an adhesion promoter, a defoaming agent, a flow and leveling agent, an amine synergist and other components typically used in glossy overprint varnish formulations. The OPV compositions of the present invention can be modified for use on any number of substrates, examples of which include coated paper, board-stock, PET and BOPP (bi-axially oriented polypropylene). The liquid, uncrosslinked, Michael addition resin is comprised of a Michael donor and a Michael acceptor. The Michael addition resin is present in amounts up to 99 wt. %, preferably from about 60 wt. % to about 98 wt %, more preferably from about 80 wt. % to about 98 wt. % based on the total weight of the OPV composition.

The Michael addition resin can be modified to enhance performance in a variety of ways, examples of which include incorporating an amine synergist for improved surface cure, a silicone for built-in "slip" modification and/or building in a conventional photoinitiator.

The liquid, uncured Michael addition resin is a polyacrylate oligomer formed from a multifunctional acrylate Michael acceptor and a β-dicarbonyl Michael donor. This technology is described in U.S. Pat. Nos. 5,945,489 and 6,025,410, both assigned to Ashland Inc. and the entire contents of which are incorporated by reference.

The β-dicarbonyl Michael donor is suitably chosen from among β-keto esters, β-diketones, β-ketoamides, and β-ketoanilides. The multifunctional acrylate Michael acceptor is suitably chosen from among diacrylates, triacrylates, tetraacrylates and the like. A range of β-dicarbonyl donors and multifunctional acrylate acceptors affords the composition designer the opportunity to exercise a great range of selectivity in the properties of the final product.

A small amount of mono-functional acrylate can be incorporated along with the multifunctional acrylates to modify the product oligomers, for instance, to enhance adhesion, toughness or other characteristics of the final Michael adduct. Monoacrylates include, but are not limited to: 2-phenoxyethyl acrylate (PEA) and/or higher order alkoxylated products, isobornyl acrylate, tetrahydrofurfuryl acrylate (THFFA), glycidyl acrylate, dodecyl acrylate, phenylthioethyl acrylate, acrylate-functional polysiloxanes, perfluoroalkyl ethyl acrylate esters and mixtures thereof. Preferably the mono-functional acrylate is present in amounts up to 20 wt %, more preferably up to 10 wt % based on the total weight of the Michael addition resin.

Diacrylates include, but are not limited to: ethylene glycol diacrylate, propylene glycol diacrylate, diethylene glycol diacrylate, dipropylene glycol diacrylate, triethylene glycol diacrylate, tripropylene glycol diacrylate, tertraethylene glycol diacrylate, tetrapropylene glycol diacrylate, polyethylene glycol diacrylate, polypropylene glycol diacrylate, ethoxylated bisphenol A diacrylate, bisphenol A diglycidyl ether diacrylate, resorcinol diglycidyl ether diacrylate, 1,3-propanediol diacrylate, 1,4-butanediol diacrylate, 1,5-pentanediol diacrylate, 1,6-hexanediol diacrylate, neopentyl glycol diacrylate, cyclohexane dimethanol diacrylate, ethoxylated neopentyl glycol diacrylate, propoxylated neopentyl glycol diacrylate, ethoxylated cyclohexanedimethanol diacrylate, propoxylated cyclohexanedimethanol diacrylate, thiodiglycol diacrylate, acrylate-functional polysiloxane, epoxy diacrylate, aryl urethane diacrylate, aliphatic urethane diacrylate, polyester diacrylate, and mixtures thereof.

Triacrylates include, but are not limited to: trimethylol propane triacrylate, glycerol triacrylate, ethoxylated trimethylolpropane triacrylate, propoxylated trimethylolpropane triacrylate, tris(2-hydroxyethyl)isocyanurate triacrylate, ethoxylated glycerol triacrylate, propoxylated glycerol triacrylate, pentaerythritol triacrylate, aryl urethane triacrylates, aliphatic urethane triacrylates, melamine triacrylates, epoxy novolac triacrylates, aliphatic epoxy triacrylate, polyester triacrylate, acrylate-functional polysiloxanes and mixtures thereof.

Tetraacrylates include, but are not limited to: di-trimethylolpropane tetraacrylate, pentaerythritol tetraacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, polyester tetraacrylates, melamine tetraacrylates, epoxy novolac tetraacrylates, acrylate-functional polysiloxanes and mixtures thereof.

The present invention can be practiced with a β-ketoester (e.g., ethyl acetoacetate), a β-diketone (e.g., 2,4-pentanedione), a β-ketoanilide (e.g., acetoacetanilide), a β-ketoamide (e.g., acetoacetamide) or a mixture of Michael donors according to the desired resin quality.

Suitable β-dicarbonyl donor compounds having functionality of 2 include, but are not limited to: ethyl acetoacetate (EAA), methyl acetoacetate, 2-ethylhexyl acetoacetate, lauryl acetoacetate, t-butyl acetoacetate, acetoacetanilide, N-alkyl acetoacetanilide, acetoacetamide, 2-acetoacetoxyethyl acrylate, 2-acetoacetoxylethyl methacrylate, allyl acetoacetate, benzyl acetoacetate, 2,4-pentanedione, isobutyl acetoacetate, and 2-methoxyethyl acetoacetate.

Suitable β-dicarbonyl donor compounds having functionality of 4 include, but are not limited to: 1,4-butanediol diacetoacetate, 1,6-hexanediol diacetoacetate, neopentyl glycol diacetoacetate, cyclohexane dimethanol diacetoacetate, and ethoxylated bisphenol A diacetoacetate.

Suitable β-dicarbonyl donor compounds having functionality of 6 include, but are not limited to: trimethylol propane triacetoacetate, glycerin triacetoacetate, and polycaprolactone triacetoacetates.

The Michael addition reaction is catalyzed by a strong base. An example of such a base is diazabicycloundecene (DBU), which is sufficiently strong and is readily soluble in the monomer mixtures. Other cyclic amidines, for example diazabicyclo-nonene (DBN) and guanidines are also suitable for catalyzing this reaction. Group I alkoxide bases such as potassium tert-butoxide, provided they have sufficient solubility in the reaction medium, are also typically adequate to promote the desired reaction. Quaternary hydroxides and alkoxides, such as tetrabutyl ammonium hydroxide or benzyltrimethyl ammonium methoxide, comprise another class of base catalysts that promote the Michael addition reaction. Finally, strong, organophilic alkoxide bases can be generated in situ from the reaction between a halide anion (e.g., quaternary halide) and an epoxide moiety. Such in situ catalysts are disclosed in U.S. Pat. No. 6,706,414 assigned to Ashland, Inc. the entire contents of which are incorporated by reference.

Figure 2:
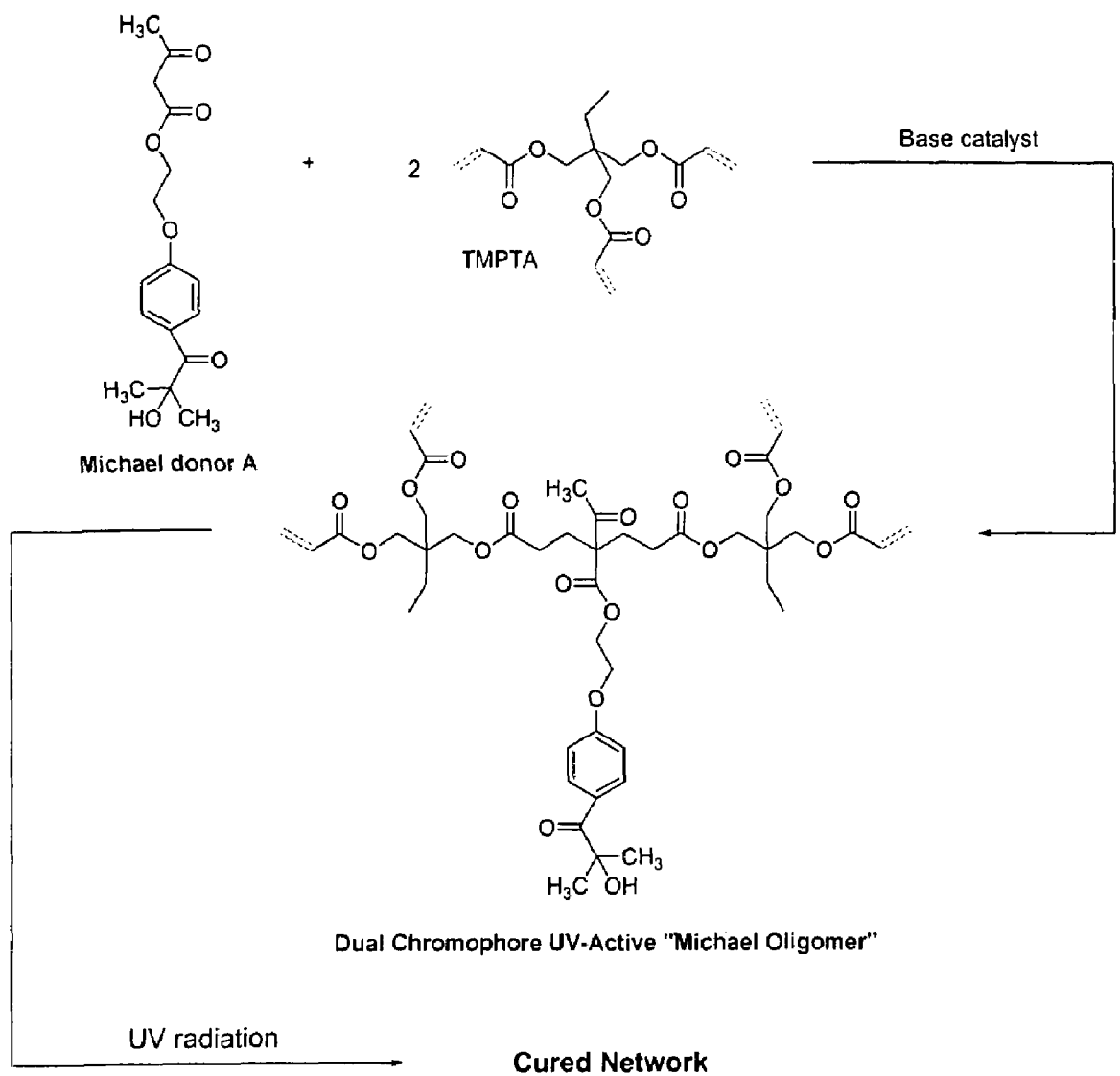
FIG. 2 depicts the use of built-in photoinitiator-modified Michael donor in the formation of a Michael addition resin and its cure via exposure to UV radiation.

The Michael addition resins can also be modified to include built in photoactive moieties based on conventional photoinitiators. In this case the β-dicarbonyl Michael donor and/or Michael acceptors are modified to contain pendant Type I (e.g., substituted benzoins, benzyl ketals, acetophenones or acyl phosphine oxides) or Type II (e.g., substituted benzophenones, thioxanthones, camphorquinones or bisimidazoles) photoactive moieties. The resulting liquid, uncrosslinked Michael addition resins possess either or both Type I and Type II photoactive functional groups that promote the addition polymerization of acrylic groups upon exposure to UV light. Examples of modified Michael donors and acceptors are shown in FIG. 1. An example of a cured network using a Type I photoactive moiety-modified acetoacetic Michael donor and TMPTA is shown in FIG. 2. Other examples of Michael addition adducts modified with built in photoinitiators are disclosed in the co-pending provisional application titled, "Radiation Curable Michael Addition Resins Having Built-in Photoinitiators", filed Apr. 21, 2004, having a U.S. Ser. No. 60/564,026, the entire contents of which are specifically incorporated by reference in its entirety.

The Michael addition resins used in the OPV compositions can also be modified to enhance performance by adding an amine synergist. An example of such a modification includes incorporating primary or secondary amines into the uncured Michael addition resin. This technique is disclosed in U.S. Pat. No. 6,673,851 the teachings of which are incorporated herein by reference. Typical primary amines include ethanolamine, methyl-1,6-hexanediamine, 3-aminopropyltrimethoxysilane, diaminopropane, benzyl amine, triethylenetetramine, isophorone diamine and mixtures thereof. Typical secondary amines include dimethylamine, dibutyl amine, diethanolamine (DEA), piperidine, morpholine and mixtures thereof. If the liquid Michael addition resin is modified with a primary or secondary amine, the modifying amine is simply reacted with the liquid, uncured, Michael addition resin. Tertiary amines can also be used as a synergist however they do not react with the resin via the pseudo Michael addition reaction as do the primary and secondary amines. Tertiary amines are considered non-reactive amine synergists in this modification paradigm. An example of a useful tertiary amine includes methyl diethanolamine (MDEA).

Diluents can also be present in the high gloss OPV compositions of the present invention. The diluents include reactive diluents such as trimethylol propane triacrylate (TMPTA), alkoxylated TMPTA, and other acrylate monomers, and although not preferred, non-reactive diluents include known solvents, such as acetone and/or plasticizers. The diluents are used to modify the viscosity of the OPV composition and in the case of acrylate monomers, participate in the final cure. Diluents can be present in amounts up to 40 wt. %.

Adhesion promoting compounds can also be present in the OPV compositions. Examples of adhesion promoting compounds include N-vinyl caprolactam, N-vinyl pyrrolidone, N-vinyl morpholine, acryloyl morpholine, vinyl ether esters, acid-functional acrylic monomers such as β-carboxyethyl acrylate or phosphoric acid acrylates, tetrahydrofurfuryl acrylate and phenoxy ethyl acrylate. Adhesion promoters can be present in amounts up to 40 wt. %.

Defoamers, both reactive and non-reactive in amounts up to 4 wt. % can be used in the present invention. Examples of suitable reactive defoaming agents such as L-37 and LG-99 are available commercially from Estron Chemicals. Examples of suitable non-reactive defoamers include silicone defoamers such as BYK 019 available commercially from BYK Chemie or TegoRad from Degussa.

Photoinitiators can be used in the present OPV compositions but in significantly reduced amounts when compared to known UV-curable OPV compositions.

Typical levels for photoinitiators in conventional OPV formulations can be 10 wt. %. Photoinitiators used in the OPVs of the present invention are present in amounts from 0 to 5 wt. %, more preferably from 0 to 4 wt %. Examples of suitable photoinitiators include those known in the art such as benzoin, benzoin methyl ether, 2-benzyl-2-dimethylamino-1-(4-morpholinophenyl)-1-butanone, 1-hydroxycyclohexyl phenyl ketone, benzophenone, 4-phenyl benzophenone, acetophenone, and the like.

Flow/leveling agents in amounts up to 4 wt. % can be used in the present OPV compositions. Examples of flow and leveling aids include polydimethylsiloxane polymers, fluorinated oligomers and the like.

The novel OPV compositions disclosed herein exhibit performance properties that make them very effective across a range of substrates and these properties can be modified greatly depending upon oligomer composition and coating formulation rather than by blending with additives, as is done in traditional UV OPV systems. The varnishes can exhibit wide ranges of flexibility, stain, scratch, weather and solvent resistance, and adherence to substrates. Almost any desired varnish performance parameter can be attained by proper selection of the raw material building blocks used to make the oligomers that form the basis of the OPV compositions. For overprint varnish applications the overprint varnish of the present invention can be formulated to have viscosities of less than 500 cP, preferably less than 300 cP, more preferably less than 200 cP measured at 25° C. All amounts given throughout the application are in wt % based on the total weight of the overprint varnish composition unless otherwise indicated.

Having thus described the invention, the following examples are provided as illustrative in nature and should not be construed as limiting.

Application of overprint varnishes to a variety of substrates in the following examples was accomplished using a suitable hand-proofer. A Pamarco spring loaded flexographic proofer was employed for making the prints. It utilizes an anilox roll, which has a carrying capacity of 2.8 bcm. Cure was achieved by exposure to a single 600 W Fusion "H" bulb or a UVT "Maxim" medium pressure mercury lamp at the specified dose.

OPV performance properties were measured by a variety of different test methods. For purposes of defining properties by means familiar to others skilled in the art, the following test methods were utilized:

| Property | ASTM or Measurement Method |
| --- | --- |
| Viscosity of OPV formulation | Brookfield CAP 2000 Viscometer |
| Cure response | Tack measured by rubbing cotton swab over the cured surface |
| Adhesion | ASTM 2359 (modified) |
| Gloss | Byk Tri Gloss Meter, 60° |

The following are the evaluation criteria utilized for assessment of varnishes in the following examples:

Gloss—Measured using a Byk Tri Gloss Meter at a 60° incident angle. Typically in order to be considered a high gloss finish the gloss value as measured using the Byk Tri Gloss Meter is about 60 or above, preferably 80 or above.

Adhesion to various substrates—ASTM 2359 test reports values 0B to 5B with 0B being a total failure and 5B exhibiting excellent adhesion. Adhesion testing was performed by the non-crosshatch method due to low coating thicknesses.

EXAMPLE

The following examples illustrate the constitution, application, cure and performance properties of OPV formulations detailed in this disclosure. Definition of each experimental oligomer is found in Table 1. All constituents are in parts per hundred by weight.

TABLE 1

Description of experimental oligomers

| Resin Designation | Raw Materials [composition in wt. %] | Viscosity (cps @ 25° C.) |
| --- | --- | --- |
| 7001-152 | 62.9 HDDA/14.8 MDI-DA/13.4 EAA/6.4 DEA/2.5 catalyst package | 560 |
| FlexCure OPV120 | 46.1 HDDA/12.2 MDI-DA/22.9 Genomer 3364/11.0 EAA/5.30 DEA/2.5 catalyst package | 611 |
| FlexCure OPV130 | 59.9 HDDA/14.5 epoxy acrylate/12.0 Actilane 584/10.7 pentanedione/2.5 catalyst package | 475 |
| FlexCure OPV140 | 51.6 HDDA/15.12 MDI-DA/14.2 Actilane 584/10.5 EAA/1.4 pentanedione/4.8 DEA/2.5 catalyst package | 645 |
| 7219-061 | 56.7 HDDA/13.7 epoxy acrylate/12.1 Actilane 584/1.8 acrylate functional silicone copolyol/10.2 pentanedione/3.1 (DEA + DBA) 2.5 catalyst package | 413 |
| 7069-143 | 14.6 Actilane 584/53.0 HDDA/14.1 MDI-DA/3.7 pentanedione/5.8 glycidyl acetoacetate/4.8 2-(4-chlorobenzoyl)benzoic acid/3.5 DEA/0.5 catalyst package | 213 |
| 7069-169 | 15.4 epoxy acrylate/55.6 HDDA/13.8 Actilane 584/6.1 glycidyl acetoacetate/5.0 2-(4-chlorobenzoyl)benzoic acid/3.7 DEA/0.4 catalyst package | 235 |
| 7069-181 | 27.5 epoxy acrylate/48.4 HDDA/9.0 TMPTA/6.0 glycidyl acetoacetate/5.0 2-(4-chlorobenzoyl)benzoic acid/3.6 DEA/0.5 catalyst package | 541 |
| FlexCure OPV150 | 57.1 HDDA/14.2 epoxy acrylate/4.7 TMPTA/6.7 TMPEOTA/6.1 pentanedione/5.5 2959AA/3.3 (DEA + DBA)/2.5 catalyst package | 296 |
| 3233R | 47.8 HDDA/12.3 epoxy acrylate/12.3 Ebecryl 81/13.6 Laromer PE 55F/5.9 EAA/4.6 pentanedione/1.0 DEA/2.5 catalyst package | 1036 |

Genomer 3364 is an amine-modified polyether acrylate from Rahn USA. Actilane 584 is an amine-modified acrylate from AKZO-Nobel Resins. 2959AA is the mixed acetoacetate product of 2-Hydroxy-1-[4-(2-hydroxy-ethoxy)-phenyl]-2-methyl-propan-1-one and t-butyl acetoacetate or diketene. DEA is diethanol amine. DBA is dibutyl amine. Laromer PE 55F is a polyester acrylate available from BASF AG.

Resin synthesis: A Michael addition resin is equivalently termed a Michael polyacrylate resin, a Michael oligomer, a Michael adduct, or a Michael addition product. A preferred Michael OPV resin, FlexCure OPV 130 was synthesized as follows: hexanediol diacrylate (HDDA, 59.9 g), amine acrylate (Actilane 584, 12.3 g), epoxy acrylate (Dow XZ 92551.00, 14.6), 2,4-pentanedione (2,4-PD, 10.7 g), glycidyl methacrylate (2.0 g), and tetrabutylammonium bromide (0.5 g) [GMA and tetrabutylammonium bromide comprise the "catalyst package" as described in Table 1] were weighed into a 250 ml 3-neck round bottom flask equipped with a mechanical stirrer and condenser. The solution was heated to 95° Celsius and held at that temperature until 100% disubstitution of the Michael donor was achieved, as defined by $^{13}C$ NMR. After 2.5 h, a viscous yellow liquid having a cone and plate viscosity of 475 cP was obtained. The yellow liquid did not gel upon standing.

Resins 7219-061, 3233-R and OPV 150 were all synthesized by the same procedure.

In the case of 7001-152, FlexCure OPV 120 and OPV 140, aromatic urethane acrylate, MDI-diacrylate (MDI-DA), was first synthesized in the reactor by the stoichiometric reaction of methylene diphenyl diisocyanate with hydroxyethyl acrylate in the presence of a tin catalyst. The Michael resin containing the MDI-DA was then synthesized by the same procedure as OPV 130, mixing in the rest of the reactants and heating to 95° Celsius and holding at that temperature until 100% disubstitution of the Michael donor was achieved, as defined by $^{13}C$ NMR. After 4 h, the reaction was cooled down and a secondary amine, diethanol amine was added to cap a portion of the acrylate groups.

Synthesis of 7069-169 from Table 1

Hexanediol diacrylate, 114.8 g, Actilane 584 (Akzo Nobel Resins), 31.7 g, XZ 92551.00 epoxy acrylate, 28.5 g, glycidyl acetoacetate (GAA), 12.5 g and tetrabutylammonium bromide, 0.96 g, were combined according to the method described in U.S. Pat. No. 6,706,414. The reactor temperature was set to 95° C. and held at that temperature until 100% disubstitution of the Michael donor was achieved, as defined by a refractive index measurement. 2-benzoylbenzoic acid, 10.3 g, was added and the reactor held at temperature until no epoxy groups were detected by FTIR. After 7 hours total cook time, diethanol amine, 7.6 g, was added to the mixture and the reaction product was cooled to room temperature with stirring. The final product was a low viscosity clear liquid having a cone and plate viscosity of 230 cP.

Syntheses of resins 7069-143 and 7069-181 was achieved by the same method as 7069-169.

OPV formulations: The OPV formulations were made by mixing all the components described in the examples, in a Hauschild centrifugal mixer for 2 to 3 minutes at 2500 sec$^{-1}$.

Example 1

OPV Formulation Based on FlexCure Resins

The final formulation (OPV-062503-01) is comprised of FlexCure resins and commercial raw materials, in parts by weight, as specified in Table 1A:

Formulation Table 1A (components in parts by weight).

| Raw Material | Description | Parts (w/w) |
|---|---|---|
| 7001-152 | Ashland self-initiating resin | 68.0 |
| TMPTA | reactive diluent | 28.0 |
| Benzophenone | photoinitiator | 1.0 |
| MDEA | amine synergist | 0.4 |
| HCPK | photoinitiator | 0.6 |
| TegoRad 2300 | siloxane-based flow agent | 2.0 |
| | | 100.0 |

Example 2

OPV Formulation Based on FlexCure Resins

The final formulation (OPV-102003-02) is comprised of FlexCure resins and commercial raw materials, in parts by weight, as specified in Table 2A:

Formulation Table 2A (components in parts by weight).

| Raw Material | Description | Parts (w/w) |
|---|---|---|
| FlexCure Resin OPV120 | Ashland self-initiating resin | 60.0 |
| TMPTA | reactive diluent | 36.0 |
| Benzophenone | photoinitiator | 1.0 |
| MDEA | amine synergist | 0.4 |
| HCPK | photoinitiator | 0.6 |
| TegoRad 2300 | siloxane based flow agent | 2.0 |
| | | 100.0 |

Example 3

OPV Formulation Based on FlexCure Resins

The final formulation (OPV-070903-02) is comprised of FlexCure resins and commercial raw materials, in parts by weight, as specified in Table 3A:

Formulation Table 3A (components in parts by weight).

| Raw Material | Description | Parts (w/w) |
|---|---|---|
| FlexCure OPV130 | Ashland self-initiating resin | 67.0 |
| TMPTA | reactive diluent | 28.0 |
| Benzophenone | photoinitiator | 1.5 |
| MDEA | amine synergist | 0.6 |
| HCPK | photoinitiator | 0.9 |
| TegoRad 2300 | siloxane based flow agent | 2.0 |
| | | 100.0 |

Example 4

OPV Formulation Based on FlexCure Resins

The final formulation (OPV-121003-01) is comprised of FlexCure resins and commercial raw materials, in parts by weight, as specified in Table 4A:

Formulation Table 4A (components in parts by weight).

| Raw Material | Description | Parts (w/w) |
|---|---|---|
| FlexCure OPV140 | Ashland self-initiating resin | 60.0 |
| TMPTA | reactive diluent | 35.0 |
| Benzophenone | photoinitiator | 1.0 |
| MDEA | amine synergist | 0.4 |
| HCPK | photoinitiator | 0.6 |
| LG 99 | slip-additive | 1.0 |
| TegoRad 2300 | siloxane based flow agent | 2.0 |
|  |  | 100.0 |

Example 5

OPV Formulation Based on FlexCure Resins

The final formulation (OPV-111504-04) is comprised of FlexCure resins and commercial raw materials, in parts by weight, as specified in Table 5A:

Formulation Table 5A (components in parts by weight).

| Raw Material | Description | Parts (w/w) |
|---|---|---|
| 7219-061 | Ashland self-initiating resin | 80.0 |
| TMPTA | reactive diluent | 18.0 |
| Benzophenone | photoinitiator | 1.0 |
| MDEA | amine synergist | 0.4 |
| HCPK | photoinitiator | 0.6 |
|  |  | 100.0 |

Example 6

OPV Formulation Based on FlexCure Resins

The final formulation (OPV-120903-07) is comprised of FlexCure resins and commercial raw materials, in parts by weight, as specified in Table 6A:

Formulation Table 6A (components in parts by weight).

| Raw Material | Description | Parts (w/w) |
|---|---|---|
| 7069-143 | Ashland self-initiating resin | 96.0 |
| LG 99 | reactive foam control agent | 1.0 |
| MDEA | amine synergist | 0.4 |
| HCPK | photoinitiator | 0.6 |
| TegoRad 2300 | siloxane based flow agent | 2.0 |
|  |  | 100.0 |

Example 7

OPV Formulation Based on FlexCure Resins

The final formulation (OPV-010204-03) is comprised of FlexCure resins and commercial raw materials, in parts by weight, as specified in Table 7A:

Formulation Table 7A (components in parts by weight).

| Raw Material | Description | Parts (w/w) |
|---|---|---|
| 7069-169 | Ashland self-initiating resin | 97.0 |
| LG 99 | reactive foam control agent | 1.0 |
| TegoRad 2300 | siloxane based flow agent | 2.0 |
|  |  | 100.0 |

Example 8

OPV Formulation Based on FlexCure Resins

The final formulation (OPV-010804-02) is comprised of FlexCure resins and commercial raw materials, in parts by weight, as specified in Table 8A:

Formulation Table 8A (components in parts by weight).

| Raw Material | Description | Parts (w/w) |
|---|---|---|
| 7069-169 | Ashland self-initiating resin | 87.0 |
| TMPTA | reactive diluent | 10.0 |
| LG 99 | reactive foam control agent | 1.0 |
| TegoRad 2300 | siloxane based flow agent | 2.0 |
|  |  | 100.0 |

Example 9

OPV Formulation Based on FlexCure Resins

The final formulation (OPV-041504-02) is comprised of FlexCure resins and commercial raw materials, in parts by weight, as specified in Table 9A:

Formulation Table 9A (components in parts by weight).

| Raw Material | Description | Parts (w/w) |
|---|---|---|
| FlexCure OPV150 | Ashland self-initiating resin | 97.0 |
| LG 99 | reactive foam control agent | 1.0 |
| TegoRad 2300 | siloxane based flow agent | 2.0 |
|  |  | 100.0 |

TABLE 2

Performance evaluation of experimental OPV formulations on coated paper:

| Formulation | % PI | Viscosity @ 30° C. (cP) | Dosage for tack-free cure (mJ/cm$^2$) | Gloss (60°) | Adhesion (coated paper, board stock, PET, BOPP) |
|---|---|---|---|---|---|
| OPV-062503-01 | 2.0 | 240 | <200 | 80.4 | 5B |
| OPV-102003-02 | 2.0 | 237 | <200 | 90.1 | 5B |
| OPV-070903-02 | 3.0 | 237 | <200 | 89.9 | 5B |
| OPV-121003-01 | 2.0 | 240 | <200 | 91.2 | 5B |
| OPV-1111504-04 | 2.0 | 249 | <200 | 92.1 | 5B |
| OPV-120903-07 | 1.0 | 174 | <200 | 92.4 | 5B |
| OPV-010204-03 | 0.0 | 216 | <200 | 90.5 | 5B |

TABLE 2-continued

Performance evaluation of experimental OPV formulations on coated paper:

| Formulation | % PI | Viscosity @ 30° C. (cP) | Dosage for tack-free cure (mJ/cm$^2$) | Gloss (60°) | Adhesion (coated paper, board stock, PET, BOPP) |
|---|---|---|---|---|---|
| OPV-010804-02 | 0.0 | 375 | <200 | 94.9 | 5B |
| OPV-041504-02 | 0.0 | 258 | <200 | 93.7 | 5B |

Example 10

OPV Formulation for Plastic Substrates Based on FlexCure Resins

The final formulation 3233R-10A is comprised of Flex-Cure resins and commercial raw materials, in parts by weight, as specified in Table 10A:

Formulation Table 10A (components in parts by weight).

| Raw Material | Description | Parts (w/w) |
|---|---|---|
| 3233R | Ashland self-initiating resin | 99.0 |
| TegoRad 2250 | siloxane based flow agent | 1.0 |
| | | 100.0 |

Example 11

OPV Formulation for Plastic Substrates Based on FlexCure Resins

The final formulation 3233R-11A is comprised of Flex-Cure resins and commercial raw materials, in parts by weight, as specified in Table 11A:

Formulation Table 11A (components in parts by weight).

| Raw Material | Description | Parts (w/w) |
|---|---|---|
| 3233R | Ashland self-initiating resin | 68.6 |
| TMPEOTA | reactive diluent | 28.4 |
| Ebecryl P-36 | polymerizable photoinitiator | 2.0 |
| TegoRad 2250 | siloxane based flow agent | 1.0 |
| | | 100.0 |

TABLE 3

Performance evaluation of experimental OPV formulations on plastic films:

| Formulation | % PI | Viscosity @ 30° C. (cP) | Dosage for tack-free cure (mJ/cm$^2$) | Adhesion (treated OPP) | Adhesion (untreated PET) |
|---|---|---|---|---|---|
| 3233R-10A Lamp Type | 0.0 | 835 | (see below) | | |
| Fusion 600 W H | 0.0 | | 395 | 5B | 5B |
| Fusion 300 W H | 0.0 | | 415 | 5B | 5B |
| UVT Maxim 400 W | 0.0 | | 345 | 5B | 5B |
| UVT Maxim 200 W | 0.0 | | 481 | 5B | 5B |
| UVT Maxim 100 W | 0.0 | | 608 | 5B | 5B |
| 3233R-11A Lamp Type | 2.0 | 345 | (see below) | | |
| Fusion 600 W H | 2.0 | | 415 | 5B | 5B |
| Fusion 300 W H | 2.0 | | 453 | 5B | 5B |
| UVT Maxim 400 W | 2.0 | | 284 | 5B | 5B |
| UVT Maxim 200 W | 2.0 | | 422 | 5B | 5B |
| UVT Maxim 100 W | 2.0 | | 502 | 5B | 5B |

The examples listed in the above Tables 2 and 3 quantify the performance of various varnishes formulated with self-initiating resins. An obvious advantage of OPV formulations based on resins built with self-initiating Michael addition resin technology is the low photoinitiator requirement to achieve the desired cure, gloss and adhesion levels. In examples 7A, 8A and 9A, no photoinitiator at all was utilized. This advantage translates into both significant cost savings and handling benefits from using less of the traditional photoinitiators which can be toxic and/or malodorous, and are often difficult to dissolve in monomers. In addition, they can contribute to film color, which can limit applicability over white and light-colored inks.

We claim:

1. A high gloss, UV curable overprint varnish composition, comprising:
   A. a liquid Michael addition resin present in amounts up to 99 wt. % based on the total weight of the overprint varnish composition, comprising the uncrosslinked reaction product of,
      i. a β-dicarbonyl Michael donor,
      ii. at least one multi-functional acrylate oligomer incorporated with mono-functional acrylate, and
      iii. at least one amine synergist; and
   B. at least one of the following,
      i. a diluent,
      ii. a photoinitiator,
      iii. an adhesion promoter,
      iv. a defoaming agent, and
      v. a flow and leveling aid,
   wherein the high gloss overprint varnish composition has a viscosity of less than about 500 centipolse.

2. The composition of claim 1, wherein the Michael donor is selected from the group consisting of a β-ketoester, a β-diketone, a β-ketoamide, a β-ketoanilide and mixtures thereof.

3. The composition of claim 1, wherein the multi-functional acrylate oligomer is selected from the group consisting of monoacrylates, diacrylates, triacrylates, tetraacrylates and mixtures thereof.

4. The composition of claim 1, wherein the Michael addition resin is modified to contain a pendant Type I photoactive and/or Type II photoactive moiety.

5. The composition of claim 1, wherein the Michael donor is modified to contain a pendant Type I photoactive and/or Type II photoactive moiety.

6. The composition of claim 1, wherein the Michael acceptor is modified to contain a pendant Type I photoactive and/or Type II photoactive moiety.

7. The composition of claim 1, wherein the Michael addition resin is present in an amount from about 60 wt % to about 98 wt %.

8. The composition of claim 1, wherein the Michael addition resin is present in an amount from about 80 wt % to about 98 wt %.

9. The composition of claim 1, containing an adhesion promoter.

10. The composition of claim 1, containing a reactive diluent.

11. The composition of claim 1, containing a reactive diluent, a photoinitiator, and a flow and leveling aid.

12. The composition of claim 1, containing a reactive diluent, a defoaming agent and a flow and leveling aid.

13. The composition of claim 1, containing a reactive diluent and a photoinitiator.

14. A coated article, comprising A. a substrate having at least one printed surface, and B. a high gloss overprint varnish on at least one printed surface of the substrate, comprising the cured, cross-linked reaction product of a liquid Michael addition resin, comprising: i. a β-dicarbonyl Michael donor, ii. at least one multi-functional acrylate oligomer incorporated with mono-functional acrylate and, iii. at least one amine synergist wherein the crosslinked reaction product has a gloss of at least 60.

15. The coated article of claim 14, wherein the Michael addition resin has a glass of at least 80.

16. The coated article of claim 14, further comprising one or more, A. diluent, B. photoinitiator, C. adhesion promoter, D. defoaming agent, or E. flow and leveling aid.

17. The coated article of claim 14, wherein the Michael addition resin is modified to contain a pendant Type I photoactive and/or Type II photoactive moiety.

18. The coated article of claim 14, wherein the Michael donor is modified to contain a pendant Type I photoactive and/or Type II photoactive moiety.

19. The coated article of claim 14, wherein the Michael acceptor is modified to contain a pendant Type I photoactive and/or Type II photoactive moiety.

20. The coated article of claim 14, wherein the Michael donor is selected from the group consisting of a β-ketoester, a β-diketone, a β-ketoamide, a β-ketoanilide and mixtures thereof.

21. The coated article of claim 14, wherein the Michael addition resin is cured via exposure to actinic radiation.

* * * * *